United States Patent [19]

Kubo et al.

[11] Patent Number: 5,708,523

[45] Date of Patent: Jan. 13, 1998

[54] COUNTERELECTRODE FOR SMART WINDOW AND SMART WINDOW

[75] Inventors: Takaya Kubo; Hiroshi Kobayashi; Yoshinori Nishikitani; Nobuyuki Kuroda; Tetsuya Seike; Junichi Nagai, all of Yokohama, Japan

[73] Assignee: Nippon Oil Co. Ltd., Tokyo, Japan

[21] Appl. No.: 633,932

[22] Filed: Apr. 17, 1996

Related U.S. Application Data

[63] Continuation-in-part of Ser. No. 336,478, Nov. 9, 1994, abandoned.

[30] Foreign Application Priority Data

Nov. 10, 1993 [JP] Japan .................. 5-281449

[51] Int. Cl.$^6$ .................................................. G02F 1/153
[52] U.S. Cl. ........................................................ 359/269
[58] Field of Search .................................. 359/265, 266, 359/269, 270, 271, 273, 275

[56] References Cited

U.S. PATENT DOCUMENTS

| | | | |
|---|---|---|---|
| 4,088,395 | 5/1978 | Giglia | 350/357 |
| 4,183,631 | 1/1980 | Kondo et al. | 350/357 |
| 5,080,470 | 1/1992 | Warszawski | 359/265 |
| 5,137,991 | 8/1992 | Epstein et al. | 525/540 |
| 5,161,048 | 11/1992 | Rukavina | 359/275 |
| 5,215,684 | 6/1993 | Okabayashi et al. | 252/582 |
| 5,225,582 | 7/1993 | Mason | 556/423 |

FOREIGN PATENT DOCUMENTS

| | | |
|---|---|---|
| 7085027 | 5/1982 | Japan . |
| 1213830 | 9/1986 | Japan . |

*Primary Examiner*—David C. Nelms
*Assistant Examiner*—Dawn-Marie Bey
*Attorney, Agent, or Firm*—Darby & Darby

[57] ABSTRACT

A counterelectrode for a smart window contains a transparent electrically conductive substrate and a plurality of electrically conductive dots arrayed on the transparent electrically conductive substrate. Each of the electrically conductive dots contains fine particles having capacitance of not less than 1 farad/g or fine particles capable of storing electrical charge of not less than 1 coulomb/g. A smart window contains the aforementioned counterelectrode.

24 Claims, 3 Drawing Sheets

COUNTERELECTRODE FOR SMART WINDOW AND SMART WINDOW

CROSS-REFERENCE TO RELATED APPLICATION

This application is a continuation-in-part of U.S. Ser. No. 08/336,478, filed Nov. 9, 1994, now abandoned.

BACKGROUND OF THE INVENTION

This invention relates to a counterelectrode for a smart window utilizing electrochromism, and to a smart window.

Figure 6:
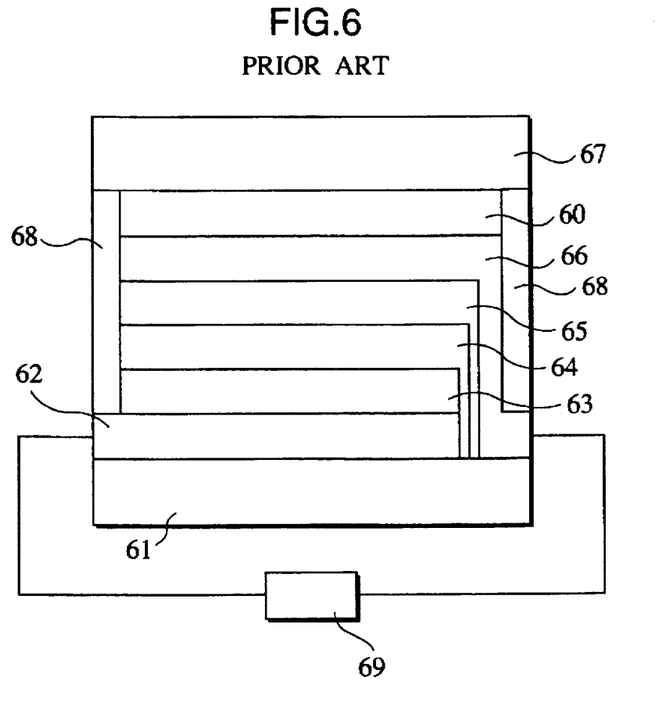
FIG. 6 is a schematic side view showing a conventional smart window.
Figure 7:
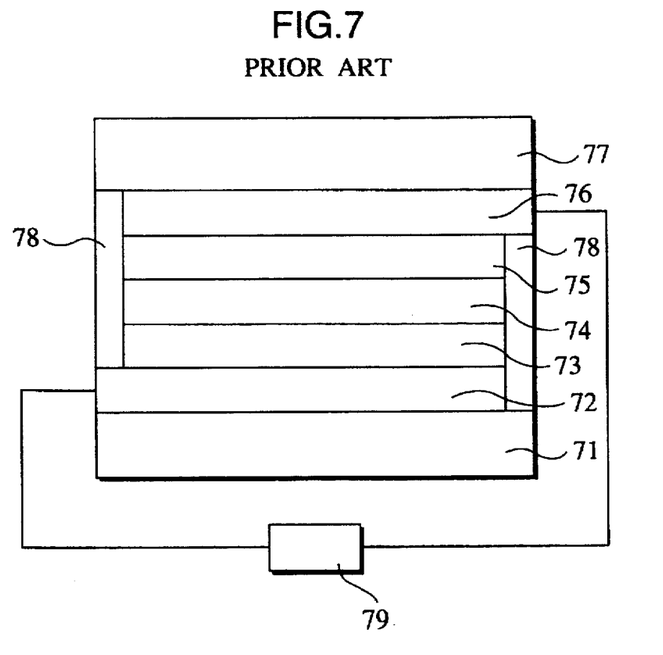
FIG. 7 is a schematic side view showing another conventional smart window.

Conventional smart windows are generally constructed as shown in FIGS. 6 and 7. The smart window shown in FIG. 6 is called an all solid type and is comprised of a transparent substrate 61 on which a transparent electrically conductive film 62, an electrochromic film 63 colored by oxidation (or reduction), an electrolytic film 64, an electrochromic film 65 colored by reduction (or oxidation) and a transparent electrically conductive film 66 are provided in this order. After bonding the transparent electrically conductive film 66 via an intermediate film 60 to a transparent substrate 67, a surrounding seal 68 is applied and the resulting assembly is subsequently connected to an electric power source 69. When a voltage exceeding a certain threshold is applied by the power source 69 across the transparent electrically conductive films 62 and 66, coloration occurs by the reaction of oxidation or reduction of the electrochromic film. The smart window shown in FIG. 7 is comprised of a first stack on a transparent substrate 71 of a transparent electrically conductive film 72 and an electrochromic film 73 colored by oxidation (or reduction), a second stack on a transparent substrate 77 of a transparent electrically conductive film 76 and an electrochromic film 75 colored by reduction (or reduction), and an electrolytic film 74, i.e. an organic electrolyte sandwiched between the first and second stacks. The operating principle is the same as that of the smart window shown in FIG. 6. With such smart window, a $WO_3$ film is preferentially employed as the layer constituting the electrochromic film colored by reduction in view of practical durability and electrochromic efficiency. However, as the layer constituting the electrochromic film colored by oxidation, or an ion storage layer, only NiO, for example has been proposed, while a material comparable to $WO_3$ in practical durability and electrochromic efficiency has not been established.

SUMMARY OF THE INVENTION

It is an object of the present invention to provide a counterelectrode for a smart window which is substantially transparent and which has a sufficiently large electrochemical capacity per unit area.

It is an object of the present invention to provide a smart window which renders it possible to achieve excellent electrochromic efficiency without any limitation as to the type of electrochromic materials and which is superior in durability of the coloration/bleaching cycles.

The above and other objects of the present invention will become apparent from the following description.

According to the present invention, there is provided a counterelectrode for a smart window comprising a transparent electrically conductive substrate and a plurality of electrically conductive dots arrayed on the transparent electrically conductive substrate. Each of the electrically conductive dots contains fine particles having capacitance of not less than 10 farad/g.

According to the present invention, each of the electrically conductive dots may contain fine particles capable of storing electrical charge of not less than 1 coulomb/g.

According to the present invention, there is also provided a smart window comprising an electrochromic electrode having a transparent substrate, a transparent electrically conductive film formed on the inner surface of the transparent substrate and an electrochromic film formed on the inner surface of the transparent electrically conductive film, and a counterelectrode as defined above. The electrochromic electrode and the counterelectrode are arranged so that the electrically conductive dots and the electrochromic film face each other with an electrolyte interposed in-between.

PREFERRED EMBODIMENTS OF THE INVENTION

The present invention will be explained in detail hereinbelow.

The counterelectrode for a smart window according to the present invention includes an array of plural electrically conductive dots on a transparent electrically conductive substrate with each dot containing at least specified fine particles.

The transparent electrically conductive substrate is a transparent substrate having a transparent electrically conductive film thereon. There is no limitation to the transparent substrate if it exhibits transparency and smoothness and may be of a material, thickness, size and shape which may be suitably selected according to the usage and application. Specifically, the substrate may be made of glass or a synthetic material, such as plastics, e.g. polyester, polysulfone, cellulose triacetate, polycarbonate, polyimide, polystyrene or poly(4-methyl pentene-1). The transparent electrically conductive film includes a film of $In_2O_3$:Sn (ITO), $SnO_2$:F and ZnO:Al. The transparent electrically conductive substrate may be fabricated by forming a transparent electrically conductive film on a transparent substrate by any suitable known means, such as vapor deposition.

The above-mentioned specified fine particles include fine particles having electrical capacitance of not less than 1 farad/g more preferably, not less than 20 farad/g, preferably not less than 10 farad/g or fine particles capable of storing electrical charges of not less than 1 coulomb/g and preferably not less than 10 coulomb/g. Although the upper values of the electrical capacitance or electrical charge are not specifically limited, the electrical capacitance may generally be not more than 200 farad/g and the electrical charge may generally be not more than 200 coulomb/g. There is no limitation to the fine particles if these exhibit electrical conductivity usually of not less than $10^{-8}$ S.cm$^{-1}$, preferably not less than $10^{-5}$ S.cm$^{-1}$ and more preferably not less than $10^{-2}$ S.cm$^{-1}$. Although the particle size is not specifically limited, each particle size may generally be 0.1 to 100 μm, and preferably 1 to 70 μm. These fine particles include fine particles of porous carbon, intercalation compounds, electrically conductive high molecular materials or mixtures thereof.

The fine particles having electrical capacitance of not less than 1 farad/g include fine particles of porous carbon having the specific surface area of not less than 10 m$^2$/g, preferably 50 to 5000 m$^2$/g and more preferably 300 to 4000 m$^2$/g. Although activated charcoal is most preferred, this is not mandatory. If the specific surface area of the porous carbon is less than 10 m$^2$/g, the smart window employing the counterelectrode is not sufficient in electrochromic efficiency for the impressed voltage of not higher than 1 V. The activated charcoal is preferably in the form of powders. Such activated charcoal may be produced by carbonizing and activating coconut husk, petroleum pitch, phenol resin, rayon, phenol fibers or polyacrylonitrile fibers.

On the other hand, the fine particles capable of storing electrical charges of not less than 1 coulomb/g include fine particles of the above-mentioned intercalation compounds and electrically conductive high molecular materials. Such fine particles as are capable of storing the above-mentioned electrical charges under an impressed voltage of not higher than 3 V are most preferred. The intercalation compounds include well-known bisulfides, such as $TiS_2$ or $MoS_2$, dioxides, such as $CoO_2$ or $NiO_2$ and electrochromic oxides, such as $W_{18}O_{49}$ or $W_{20}O_{58}$. The electrically conductive high molecular materials include electrically conductive high molecular materials mainly composed of polyaniline, polythiophene, polypyrrole, polyphenylene vinylene and ployacene and produced by doping.

Although it suffices if the electrically conductive dots contain the above-mentioned specified fine particles, it is possible to admix electrically conductive materials, preferably graphite or acetylene black for improving electrical conductivity between adjacent particles. For arraying the electrically conductive dots on the transparent substrate, it is also possible to admix a binder, for example, for binding the above-mentioned specified fine particles to one another. There is no particular limitation to the binder if it remains inert to the electrolytic solution and is not electrolyzed after curing. Examples of the binder include high molecular solid electrolyte, as later explained, epoxy rein, acrylic resin, melamine resin, teflon, polystyrene, carboxymethyl cellulose, and mixtures thereof. The binder is desirably admixed in an amount which will give the specified fine particles: binder weight ratio of 10:90 to 90:10, preferably 20:80 to 80:20.

Figure 1:
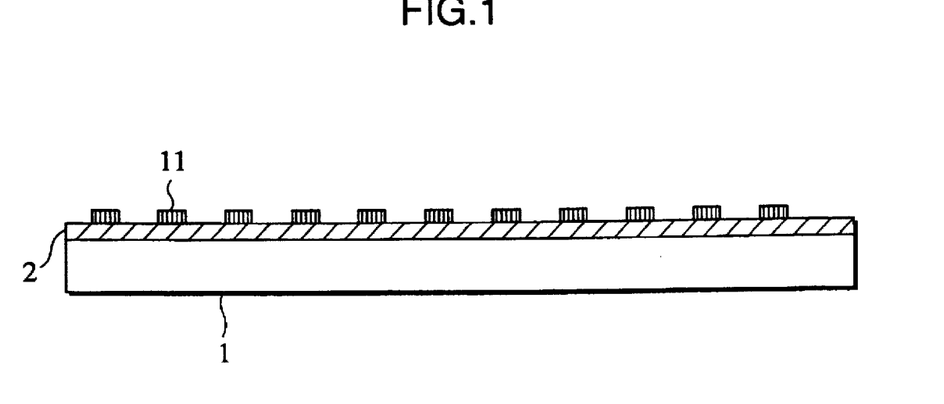
FIG. 1 is a schematic front view showing an embodiment of a counterelectrode for a smart window according to the present invention.

With the counterelectrode for the smart window according to the present invention, plural electrically conductive dots, each containing the above-mentioned specified particles, are arrayed on the transparent substrate so that the counterelectrode is substantially rendered to be seen through. In the present specification, the expression "the electrically conductive dots are arrayed" or "arraying the electrically conductive dots" is not to be construed in a limiting sense provided that the respective electrically conductive dots are located substantially discretely. It is, however, preferred that the above dots 11 in the form of cylinders be arrayed in a matrix pattern, at an equal distance from one another on the transparent electrically conductive substrate made up of a transparent substrate 1 and a transparent electrically conductive film 2, as shown for example in FIGS. 1 and 2. Although there is no limitation to the shape of the electrically conductive dots, it is preferably a cylinder, a cone, a square prism or a square pyramid. The size of each electrically conductive dot, that is outside diameter or height, and the coverage ratio of the plural electrically conductive dots to the overall electrode, that is (the sum of areas of respective dots)/(surface area of the transparent eclectically conductive substrate)×100, can be exhaustively determined taking into account the visual amenability and attractive appearance on bleaching and visual amenability and coloration degree on coloration. Specifically, each electrically conductive dot is preferably 1 to 10000 μm, more preferably 10 to 1000 μm in diameter or size, and preferably 10 to 1000 μm, more preferably 20 to 500 μm in height. The coverage ratio of the electrically conductive dots in their entirety to the surface area of the transparent electrically conductive substrate is preferably 3 to 70% and more preferably 5 to 50%. The dots need not be of uniform size or shape.

The electrically conductive dots are usually independent of one another, as mentioned above, and are substantially discrete. However, the dots may be connected by thin lines of the above-mentioned specified fine particles capable of being charged or discharged, the electrically conductive materials, the binder or mixtures thereof, insofar as the visual amenability and attractive appearance on bleaching are not deteriorated to an unallowable extent.

With the counterelectrode for the smart window according to the present invention, the side thereof opposite to the dots 11, that is the transparent electrically conductive substrate side, may be coated by a white-hued material, that is, may be provided with white-hued pigments or white to silver hued electrically conductive paste. Specifically, the white-hued coating is arrayed on the transparent substrate 1 with a pattern coincident or substantially coincident with the pattern of the dots 11. The transparent electrically conductive film 2 is then placed on the overall surface and subsequently the dots 11 are arrayed thereon. On the other hand, the white-hued material is arrayed on the transparent electrically conductive film 2 of the transparent electrically conductive substrate with a pattern similar to the pattern of the dots 11 and the dots 11 are arrayed thereon. Alternatively, the white-hued material is arrayed on the back side of the transparent substrate 1 with the same pattern as the pattern of the dots 11, and the transparent electrically conductive film 2 is deposited on the overall surface of the transparent substrate 1. The dots 11 are finally arrayed thereon, Examples of the white-hued material include titanium oxide, zinc oxide, lithopone, lead white, antimony white and zirconium oxide.

There is no limitation to the method for fabricating the counterelectrode for the smart window according to the present invention. For example, the above-mentioned specified fine particles, occasionally the electrically conductive materials and the binder are mixed together to form a paste which is formed to a desired shape on the surface of the transparent electrically conductive substrate by any suitable conventional printing methods such as screen printing, lithography, gravure printing, intaglio printing, flexo printing, letterpress printing or special printing. Alternatively, dot-shaped grooves are previously formed on the surface of the transparent electrically conductive substrate and the paste of the dots are charged into these grooves. Any excess paste may be subsequently removed using a spatula.

The smart window according to the present invention has the above-mentioned counterelectrode for the smart window and an electrochromic electrode with an electrolyte interposed therebetween. The electrochromic electrode is comprised of an oxidation or reduction type electrochromic film formed on a transparent electrically conductive film of the transparent electrode substrate made up of a transparent substrate and the electrically conductive film.

Among the preferred materials constituting the electrochromic films, there are reduction type electrochromic materials, that is electrochromic materials colored by reduction, such as $WO_3$, $MoO_3$, $V_2O_5$, $Nb_2O_5$ or $TiO_2$, oxidation electrochromic materials, that is electrochromic materials colored by oxidation, such as NiO, $Cr_2O_3$, $MnO_2$, CoO, $IrO_2$ or Prussian blue and organic electrochromic materials, such as polyaniline. These may be formed into films by conventional methods, such as by vacuum deposition, electron beam vacuum deposition or sputtering.

The substrate similar to the transparent electrically conductive substrate explained in connection with the counterelectrode, may be employed as the transparent electrode substrate for the electrochromic electrode.

For the electrolytes, liquid or solid electrolytes may be suitably selected according to the intended usage and application. The liquid electrolytes may be enumerated by solutions of alkali metal salts, quaternary ammonium salts etc., in organic solvents, such as propylene carbonate, ethylene carbonate, sulfolane, β-butyrolactone, dimethyl formamide, dimethyl sulfoxide, tetrahydrofuran or dimethoxyethane, or mixtures thereof. The solid electrolytes may be enumerated by high molecular solid electrolytes prepared by dissolving alkali metal salts, quaternary ammonium salts etc., in a polymer matrix, such as polyethylene oxide, polyoxyethylene glycol polymethacrylate or the like. It is preferred that the electrolytes employed in the present invention have ionic conductivity of not less than $10^{-4}$ S/cm in view of their response.

Figure 2:
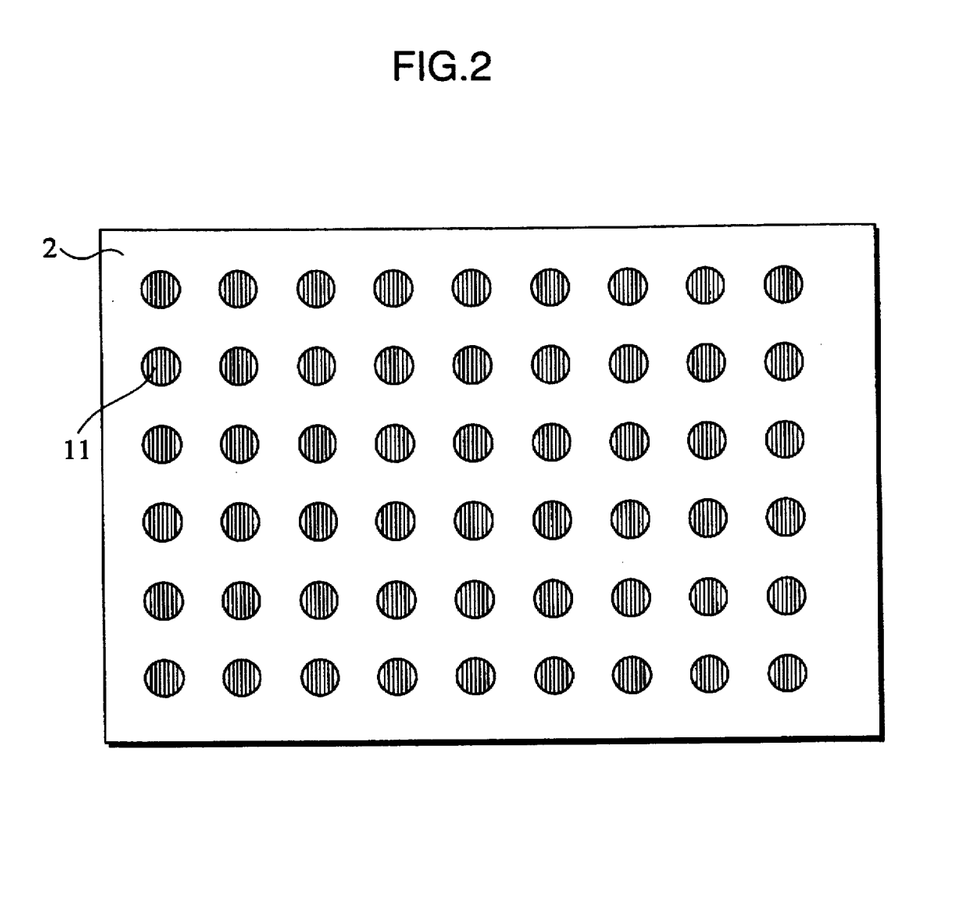
FIG. 2 is a schematic plan view showing the counterelectrode shown in FIG. 1.
Figure 3:
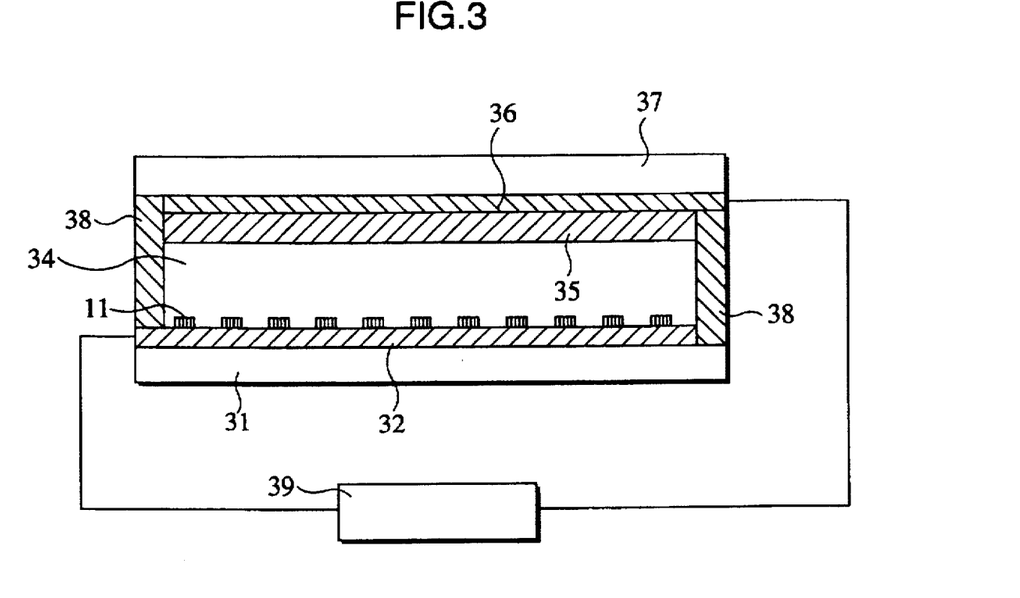
FIG. 3 is a schematic side view showing an embodiment of a smart window according to the present invention.

The smart window according to the present invention may be exemplified by an apparatus comprised of a counterelectrode made up of a transparent substrate 31, a transparent electrically conductive film 32 deposited thereon and a matrix array of plural electrically conductive dots with equal distances between the dots similar to the arrangement shown in FIG. 2, and an electrochromic electrode comprised of a transparent substrate 37, a transparent electrically conductive film 36 formed thereon to form an electrode, and a reduction or oxidation type electrochromic film 35 formed thereon, with an electrolyte 34 being charged into a space defined between the counterelectrode and the electrochromic electrode, and a sealant 38 hermetically sealing the perimetral region of the resulting assembly, with a lead wire being connected across the electrically conductive films 32, 36 and to a power source 39, as shown for example in FIG. 3.

Since the counterelectrode for the smart window according to the present invention is comprised of a matrix array of electrically conductive dots each containing specified fine particles having a large electrochemical capacitance, the smart window prepared by combining such counterelectrode with the electrochromic electrode composed of various electrochromic materials exhibits high electrochromic efficiency that is high optical density difference between the time of coloration and the time of bleaching, even although the impressed voltage is relatively low. As a result, the smart window according to the present invention is superior in coloring and bleaching cycles, and hence may be employed for various purposes, such as for building windows, vehicle windows or partitions.

EXAMPLES OF THE INVENTION

The present invention will be explained in more detail by referring to Examples and Comparative Examples, which are given only for the sake of illustration.

Example 1

Preparation of Counterelectrode 8 g of powers of activated charcoal having a specific surface area of 1500 $m^2/g$, manufactured by KURARAY CO. LTD. under a trade name of "YP-17", 4 g of graphite, manufactured by NIPPON GRAPHITE INDUSTRIES, LTD. under the trade name of "USSP", 10 g of acrylic thermosetting resin, manufactured by TOAGOSEI CHEMICAL INDUSTRY CO., LTD. under the trade name of "S-4030", 2.2 g of melamine resin manufactured by SANWA CHEMICAL INDUSTRY CO., LTD. under the trade name of "MX-470" and 24 g of butyl cellosolve were mixed together to produce an activated charcoal paste. Then, using a screen having a uniform matrix-shaped array of cylindrical openings each being 150 μm in diameter and 50 μm in height, with the area ratio of the matrix-shaped array of the openings to the entire screen being 15%, the above-mentioned activated charcoal paste was printed in dots on an ITO glass (a transparent electrically conductive glass having $In_2O_3$ and $SnO_2$ vapor-deposited thereon), which is 10 Ω/□ and 10 cm by 10 cm in size. The resulting assembly was heat-cured at 165° C. for 0.5 hour to prepare a counterelectrode.

Measurement of Electrical Capacitance

Twelve grams of powders of activated charcoal having a specific surface area of 1500 $m^2/g$, manufactured by KURARAY CO., LTD., under a trade name of "YP-17", 10 g of acrylic thermosetting resin, manufactured by TOAGOSEI CHEMICAL INDUSTRY CO., LTD., under the trade name of "S-4030", 2.2 g of melamine resin, manufactured by SANWA CHEMICAL INDUSTRY CO., LTD., under the trade name of "MX-470" and 24 g of butyl cellosolve were mixed together to produce an activated charcoal paste. Then, using a screen having a uniform matrix-shaped array of cylindrical openings each being 150 μm in diameter and 50 μm in height, with the area ratio of the matrix-shaped array of the openings to the entire screen being 15%, the above-mentioned activated charcoal paste was printed in dots on an ITO glass (a transparent electrically conductive glass having $In_2O_3$ and $SnO_2$ vapor-deposited thereon), which is 10 Ω/□ and 5 cm by 5 cm in size. The resulting assembly was heat-cured at 165° C. for 0.5 hour to prepare a counterelectrode.

Two of the counterelectrodes thus prepared were placed facing each other with a gap of 0.3 mm therebetween, and the perimeter region of the two counterelectrodes was sealed with an epoxy resin at a width of 5 min. The inner space was charged in vacuum with a propylene carbonate solution of $LiClO_4$ (1M/liter), i.e. an electrolyte, and the charging opening was sealed with an epoxy resin. Lead wires were connected to each of the two counterelectrodes for preparing a test cell.

The electric charge (C) of the cell was calculated by the formula C=Q/ΔV, wherein Q represents the amount of electric charged, and ΔV represents the electric potential shifted between the two lead wires when the electric was charged on the test cell in a constant current. Then, electrical capacitance of the electrode was calculated with electrical capacitance of one electrode being taken as 2C. The electric potential shift (ΔV) does not contain electric potential shift due to the impedance component of the electrode. In particular, when 96 mQ of electrical charge were charged in the cell, it was seen that electrical potential shift (ΔV) was 0.54 V, the electrical capacitance (C) of the test cell was 0.178 farad, and thus the electrical capacitance of the electrode was 0.356 farad.

A counterelectrode having the same activated charcoal paste printed in dots on an ITO glass was prepared by the same method as described above. The dots of the cured activated charcoal paste were scraped off the ITO glass and collected. The weight of the collected cured dots was measured to be 13.5 mg. and the weight of the powders of the activated charcoal, i.e. the electrode active material in the collected cured dots was found to be 10.1 mg.

It was seen from the above results that electric capacitance per unit of the powders of activated charcoal as the electrode active material in the dots was 35.2 farad/g.

Preparation of Electrochromic Electrode

On an ITO glass, 10 cm by 10 cm in size, $WO_3$ was vapor-deposited to a thickness of 5000 Å at room temperature and at a rate of 20 to 30 Å/second for preparing an electrochromic electrode.

Preparation of Smart Window

The electrochromic electrode was placed facing the counterelectrode with a gap of 0.2 mm therebetween, and the perimetral region of the two electrodes was sealed with an epoxy resin at a width of 5 mm. The inner space was charged in vacuum with a propylene carbonate solution of $LiClO_4$, i.e. an electrolyte, at a rate of 1M/liter, and the charging opening was sealed with an epoxy resin. Lead wires were connected to the electrochromic electrode and the counterelectrode for preparing the smart window. The various properties of the smart window thus prepared were evaluated by the following tests.

Coloring Test

An electrical voltage of 1 V was applied for 120 seconds across the electrochromic electrode as a positive terminal and the counterelectrode as a negative terminal. It was seen that the resulting assembly was colored uniformly in blue, with the optical density on coloration being 1.10.

Bleaching Test

An electric voltage of 1 V was applied for 60 seconds across the electrochromic electrode as a positive terminal and the counterelectrode as a negative terminal. It was seen that coloration disappeared quickly, with the optical density at the time of color extinction being 0.19. Thus, it was seen that the optical density difference between coloration and bleaching (color extinction) was 0.91, thus demonstrating sufficient coloring effects and sufficient electrochromic efficiency.

Cyclic Test

The coloring test and the bleaching test were carried out each 100000 times. It was seen that cyclic characteristics were highly stable without any remnant coloring, lowering in response or lowering in the optical density.

Comparative Example 1

A smart window was prepared in the same way as in Example 1 except that the activated charcoal dots were not provided when preparing a counterelectrode in Example 1, and the smart window was operated under the same conditions as in Example 1. The optical density difference of 0.21 was noticed between the time of coloration and bleaching, thus resulting in poor electrochromic efficiency.

Example 2

Preparation of Counterelectrode

Using a screen having a uniform matrix array of cylindrical holes each being 150 μm in diameter and 50 μm in height, with the area ratio of the holes to the screen surface being 15%, the activated charcoal paste prepared in Example 1 was printed in dots on an ITO glass, 30 cm by 30 cm in size, and subsequently heat-cured at 165° C. for 0.5 hour for preparing a counterelectrode.

Preparation of Electrochromic Electrode

On an ITO glass, 30 cm by 30 cm in size, $WO_3$ was vapor-deposited to a thickness of 5000 Å at room temperature and at a rate of 20 to 30 Å/second for preparing an electrochromic electrode.

Preparation of Smart Window

The electrochromic electrode was placed facing the counterelectrode with a gap of 0.2 mm therebetween, and the perimetral region of the two electrodes was sealed with an epoxy resin at a width of 5 mm. The inner space was charged with a pre-set quantity of a mixed liquid of 2 ml of methoxy polyethylene glycol acrylate manufactured by SHIN-NAKAMURA CHEMICAL CO., LTD under the trade name of "M-40G", 6 ml of a propylene carbonate solution of $LiClO_4$ (1M/liter) and 40 μl of a radical initiator manufactured by NFO CORPORATION under the trade name of "NYPER BMT". The charging opening was sealed with an epoxy resin and the reaction system was cured for 8 hours to produce a high molecular solid electrolyte. Lead wires were connected to the electrochromic electrode and the counterelectrode for preparing the smart window. The smart window could easily be increased in size by employing the high molecular solid electrolyte. The various properties of the smart window thus prepared were evaluated by the following tests.

Coloring Test

An electrical voltage of 1V was applied for 240 seconds across the electrochromic electrode as a negative. terminal and the counterelectrode as a positive terminal. It was seen that the resulting assembly was uniformly colored in blue, with the optical density on coloration being 1.03.

Bleaching Test

An electric voltage of 1 V was applied for 120 seconds across the electrochromic electrode as a positive terminal and the counterelectrode as a negative terminal. It was seen that coloration disappeared quickly, with the optical density at the time of color extinction being 0.23. Thus, it was seen that the optical density difference between coloration and bleaching (color extinction) was 0.80, thus demonstrating sufficient coloring effects and sufficient electrochromic efficiency.

Example 3

Figure 4:
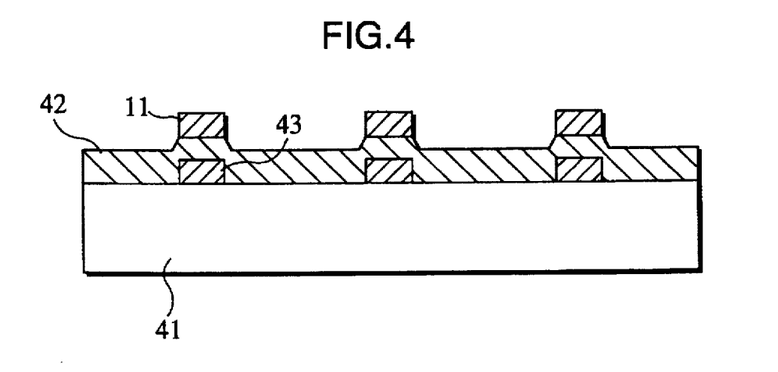
FIG. 4 is a schematic side view shown partially in cross-section showing a counterelectrode for a smart window fabricated in Example 3.

Preparation of Counterelectrode 10 g of titanium oxide having a mean particle size of 0.25 to 0.40 μm manufactured by ISHIHARA SANGYO KAISHA, LTD. under the trade name of "TIPAQUE R-820", 15 g of an acrylic thermosetting resin manufactured by TOAGOSEI CHEMICAL INDUSTRY CO., LTD. under the trade name of "S-4030", 3 g of a melamine resin manufactured by SANWA CHEMICAL INDUSTRY CO., LTD. under the trade name of "MX-470" and 30 g of methyl cellosolve were mixed together for preparing a titanium oxide paste. Then, using a screen having a uniform matrix-shaped array of cylindrical openings each being 150 μm in diameter and 50 μm in height, with the area ratio of the matrix-shaped array of the openings to the entire screen being 15%, the titanium oxide paste was printed on a hard glass, 10 cm by 10 cm in size, and heat-cured at 165° C. for 0.5 hour. An ITO film was then vacuum-deposited by a sputtering method to a film thickness of 4000Å on a hard glass carrying the titanium oxide paste. Then, using the activated charcoal paste of the same composition as in Example 1 and the aforementioned screen, the activated charcoal paste was printed in dots in registration with the white-hued dots of titanium oxide via the ITO film. The resulting assembly was heat-cured at 165° C. for 0.5 hour for preparing a counterelectrode. FIG. 4 shows the counterelectrode in cross-section. In FIG. 4, 41 denotes hard glass, 42 ITO film, 43 titanium oxide dots and 11 activated charcoal dots.

Preparation of Electrochromic Electrode and smart window

An electrochromic electrode and a smart window were prepared in the same way as in Example 1. The properties of the produced smart window were evaluated by the following tests.

Coloring Test

An electrical voltage of 1 V was applied for 120 seconds across the electrochromic electrode as a negative terminal and the counterelectrode as a positive terminal. It was seen that the resulting assembly was colored uniformly in blue, with the optical density on coloration being 1.15.

Bleaching Test

An electric voltage of 1 V was applied for 60 seconds across the electrochromic electrode as a positive terminal and the counterelectrode as a negative terminal. It was seen that coloration disappeared quickly, with the optical density at the time of color extinction being 0.25. Thus, it was seen that the optical density difference between coloration and bleaching (color extinction) was 0.90, thus showing sufficient coloring effects and sufficient electrochromic efficiency.

Cyclic Test

The coloring test and the bleaching test were carried out each 80000 times. It was seen that cyclic characteristics were highly stable without any remnant coloring, lowering in response or lowering in the optical density.

Visual Amenability

The smart window, as viewed from the ITO glass side, was excellent in visual amenability and appearance since the dots were white-hued.

Example 4

Preparation of Counterelectrode

Using a screen having a uniform matrix array cylindrical holes each being 150 μm in diameter and 50 μm in height, with the area ratio of the holes to the screen surface being 30%, an electrically conductive silver paste manufactured by TOKURIKI KAGAKU CO., LTD. under the trade name of "SILVEST P-255", was printed in dots on a hard glass, 10 cm ×10 cm in size. Then, ITO was vapor-deposited to a film, thickness of 4000 Å on the printed surface by the sputtering method. Then, using the activated charcoal paste having the same composition as that of Example 1 and the screen, the activated charcoal paste was printed in dots in registration with the silver dots via the ITO film. The resulting assembly was heat-cured at 165° C. for 0.5 hour for preparing a counterelectrode.

Preparation of Electrochromic Electrode and Smart Window

An electrochromic electrode and a smart window were prepared in the same way as in Example 1. The properties of the produced smart window were evaluated by the following tests.

Coloring Test

An electrical voltage of 1 V was applied for 60 seconds across the electrochromic electrode as a negative terminal and the counterelectrode as a positive terminal. It was seen that the resulting assembly was colored uniformly in blue, with the optical density on coloration being 1.50.

Bleaching Test

An electric voltage of 1 V was applied for 30 seconds across the electrochromic electrode as a positive terminal and the counterelectrode as a negative terminal. It was seen that coloration disappeared quickly, with the optical density at the time of color extinction being 0.48. Thus it was seen that the optical density difference between coloration and bleaching (color extinction) was 1.02, thus showing sufficient coloring effects and sufficient electrochromic efficiency.

Cyclic Test

The coloring test and the bleaching test were carried out each 90000 times. It was seen that cyclic characteristics were highly stable without any remnant coloring, lowering in response or lowering in the optical density.

Visual Amenability

The smart window, as viewed from the ITO glass side, was excellent in visual amenability and appearance since the dots were silver-hued.

Example 5

Preparation of Counterelectrode

Powders of metal tungsten and powders of tungsten oxide were mixed at a ratio of $WO_{2.72}$ and were charged into a quartz tube in vacuum and heated at 800° C. for ten hours to produce $W_{18}O_{49}$. This material was ball-milled for 24 hours to give powders of $W_{18}O_{49}$. 15 g of the powders were mixed with an acrylic thermosetting resin manufactured by TOAGOSEI CHEMICAL INDUSTRY CO. LTD. under the trade name of "S-4030", 3 g of melamine resin manufactured by SANWA CHEMICAL INDUSTRY CO., LTD. under the trade name of "MX-470" and 30 g of butyl cellosolve to produce a paste of $W_{18}O_{49}$. Then, using a screen having a uniform matrix-shaped array of cylindrical openings each being 300 μm in diameter and 50 μm in height, with the area ratio of the matrix-shaped array of the openings to the entire screen being 15%, the above-mentioned paste was printed in dots on an ITO glass, 10 cm by 10 cm in size. The resulting assembly was heat-cured at 165° C. for 0.5 hour to prepare a counterelectrode.

Measurement of Electric Charge

Fifteen grams of the powders of $W_{18}O_{49}$, 15 g of acrylic thermosetting resin, manufacture by TOAGOSEI CHEMICAL INDUSTRY CO., LTD., under the trade name of "S-4030", 3 g of melamine resin, manufactured by SANWA CHEMICAL INDUSTRY CO., LTD., under the trade name of "MX-470" and 30 g of butyl cellosolve were mixed together to produce a paste of $W_{18}O_{49}$. Then, using a screen having a uniform matrix-shaped array of cylindrical openings each being 300 μm in diameter and 50 μm in height, with the area ratio of the matrix-shaped array of the openings to the entire screen being 15%, the above-mentioned paste of $W_{18}O_{49}$ was printed in dots on an ITO glass, which is 10 Ω/□ and 5 cm by 5 cm in size. The resulting assembly was heat-cured at 165° C. for 0.5 hours to prepare a counterelectrode.

A platinum electrode of 5 cm by 5 cm in size, the above-mentioned counterelectrode, and a SCE reference electrode were placed in a glass container of 3 cm by 6 cm by 6 cm in size with the platinum electrode and the counterelectrode facing each other with a gap of 20 mm therebetween, and the SCE reference electrode being placed in the vicinity of the counterelectrode via a salt bridge. The inner space of the glass container was charged with a propylene carbonate solution of $LiClO_4$ (1 mole/liter), i.e., an electrolyte. Then, lead wires were connected to the platinum electrode and the counterelectrode for preparing a test cell.

An electrical voltage of 3.0 V was applied between the counterelectrode and the SCE of the cell. It was seen that electric charge of 615 mC was charged on the counterelectrode.

A counterelectrode having the same paste of $W_{18}O_{49}$ printed in dots on an ITO glass was prepared by the same method as described above. The dots of the cured paste of $W_{18}O_{49}$ were scraped off the ITO glass and collected. The weight of the collected cured dots was measured to be 660 mg, and the weight of the powders of $W_{18}O_{49}$, i.e. the electrode active material, in the collected cured dots was found to be 330 mg.

It was seen from the above results that 1.86 coulomb/g of electric charge could be stored per unit of the powders of $W_{18}O_{49}$ as the electrode active material in the dots.

Preparation of Electrochromic Electrode and Smart Window

An electrochromic electrode and a smart window were prepared in the same way as in Example 1. The properties of the produced smart window were evaluated by the following tests.

Coloring Test

An electrical voltage of 1.5 V was applied for 120 seconds across the electrochromic electrode as a negative terminal and the counterelectrode as a positive terminal. It was seen that the resulting assembly was colored uniformly in blue, with the optical density on coloration being 0.90.

Bleaching Test

An electric voltage of 1.5 V was applied for 60 seconds across the electrochromic electrode as a positive terminal and the counterelectrode as a negative terminal. It was seen that coloration disappeared quickly, with the optical density at the time of color extinction being 0.20. Thus, it was seen that the optical density difference between coloration and bleaching (color extinction) was 0.70, thus demonstrating sufficient coloring effects and sufficient electrochromic efficiency.

Cyclic Test

The coloring test and the bleaching test were carried out each 50000 times. It was seen that cyclic characteristics were highly stable without any remnant coloring, lowering in response or lowering in the optical density.

Visual Amenability

The smart window, as viewed from the ITO glass side, was excellent in visual amenability and appearance since the dots were blue-hued.

Example 6

Preparation of Counterelectrode 40 g of powers of activated charcoal having a specific surface area of 1500 $m^2/g$, manufactured by KURARAY CO. LTD. under a trade name of "YP-17", 20 g of graphite, manufactured by NIPPON GRAPHITE INDUSTRIES, LTD., under the trade name of "USSP", 50 g of acrylic thermosetting resin, manufactured by TOAGOSEI CHEMICAL INDUSTRY CO. LTD., under the trade name of "S-4030", 11 g of melamine resin, manufactured by SANWA CHEMICAL INDUSTRY CO. LTD. under the trade name of "MX-470" and 120 g of butyl cellosolve were mixed together to produce an activated charcoal paste. Then, using a screen having a matrix-shaped array of cylindrical openings of 50 μm in height and 200 μm in diameter at a peripheral region of the screen and continuously changed in diameter to 600μmin diameter at a center part of the screen, with the area ratio of the matrix-shaped array of the openings to the entire screen being 30%, the above-mentioned activated charcoal paste was printed in dots on an ITO glass, 30 cm by 30 cm in size. The resulting assembly was heat-cured at 165° C. for 0.5 hour to prepare a counterelectrode.

Preparation of Electrochromic Electrode

On an ITO glass, 30 cm by 30 cm in size, $WO_3$ was vapor-deposited to a thickness of 5000 Å at room temperature and at a rate of 20 to 30 Å/second for preparing an electrochromic electrode.

Preparation of Smart Window

The electrochromic electrode was placed facing the counterelectrode, with glass beads, 100 μm in diameter as a spacer, and the perimetral region of the two electrodes was sealed with an epoxy resin at a width of 5 mm. The inner space was charged in vacuum with a propylene carbonate solution of $LiClO_4$, i.e. an electrolyte, at a rate of 1M/liter, and the charging opening was sealed with an epoxy resin. Lead wires were connected to the electrochromic electrode and the counterelectrode for preparing a smart window. The various properties of the smart window thus prepared were evaluated by the following tests.

Coloring Test

An electrical voltage of 1.5 V was applied for 60 seconds across the electrochromic electrode as a negative terminal and the counterelectrode as a positive terminal. It was seen that the resulting assembly was colored uniformly in blue, with the optical density on coloration being 1.20.

Bleaching Test

An electric voltage of 1.5 V was applied for 30 seconds across the electrochromic electrode as a positive terminal and the counterelectrode as a negative terminal. It was seen that coloration disappeared quickly, with the optical density at the time of color extinction being 0.20. Thus, it was seen that the optical density difference between coloration and bleaching (color extinction) was 1.00, thus demonstrating sufficient coloring effects and sufficient electrochromic efficiency. Coloration and bleaching were, highly uniform without the response being delayed at the center region from the response at the peripheral region.

Cyclic Test

The coloring test and the bleaching test were carried out each 100000 times. It was seen that cyclic characteristics were highly stable without any remnant coloring, lowering in response or lowering in the optical density.

Comparative Example 2

A smart window was prepared in the same way as in Example 6 except that the activated charcoal dots were not provided on the counterelectrode in Example 6, and the smart window was operated under the same conditions as in Example 5. Coloration and bleaching were produced from the peripheral region in a non-uniform manner.

Example 7

Preparation of Counterelectrode

Figure 5:
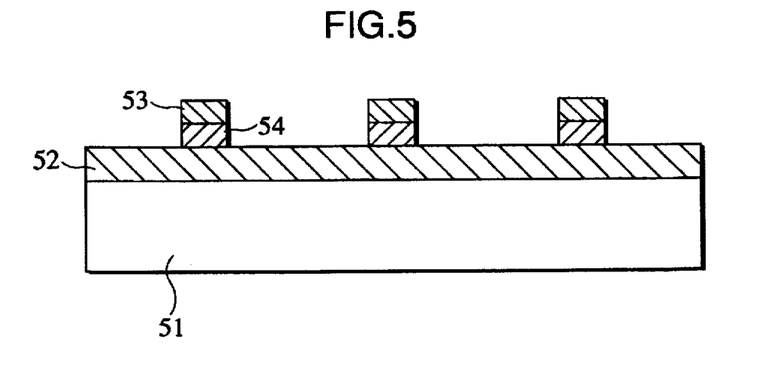
FIG. 5 is a schematic side view shown partially in cross-section showing a counterelectrode for a smart window fabricated in Example 7.

A counterelectrode having activated charcoal dots formed thereon in the same way as in Example 6 was prepared. A white-hued paste was printed in the same way as in Example 2 so that printed dots were in registration with the activated charcoal dots. The resulting assembly was then heat-cured to give a counterelectrode shown in FIG. 5, in which 51 denotes the glass, 52 ITO film, 53 white-hued paste dots and 54 activated charcoal dots.

Preparation of Electrochromic Electrode and Smart Window

An electrochromic electrode and a smart window were prepared in the same way as in Example 6. Since the white-hued dots on the activated charcoal played the part of spacers, there was no necessity of employing glass beads, and hence the process for the preparation of the smart window was significantly shortened. The properties of the produced smart window were evaluated by the following tests.

Coloring Test

An electrical voltage of 1.5 V was applied for 60 seconds across the electrochromic electrode as a negative terminal and the counterelectrode as a positive terminal. It was seen that the resulting assembly was colored in blue, with the optical density on coloration being 1.10.

Bleaching Test

An electric voltage of 1.5 V was applied for 60 seconds across the electrochromic electrode as a positive terminal and the counterelectrode as a negative terminal. It was seen that coloration disappeared quickly, with the optical density at the time of color extinction being 0.25. Thus, it was seen that the optical density difference between coloration and bleaching (color extinction) was 0.85, thus showing sufficient coloring effects and sufficient electrochromic efficiency.

Cyclic Test

The coloring test and the bleaching test were carried out each 100000 times. It was seen that cyclic characteristics were highly stable without any remnant coloring, lowering in response or lowering in the optical density.

Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A counterelectrode for a smart window comprising a transparent electrically conductive substrate and a plurality of electrically conductive dots each discretely arrayed on the transparent electrically conductive substrate, each of the electrically conductive dots containing fine particles having capacitance of not less than 10 farad/g.

2. A counterelectrode for a smart window comprising a transparent electrically conductive substrate and a plurality of electrically conductive dots each discretely arrayed on the transparent electrically conductive substrate, each of the electrically conductive dots containing fine particles capable of storing electrical charge of not less than 1 coulomb/g.

3. The counterelectrode as claimed in claim 1 or 2 wherein said fine particles exhibit electrical conductivity of not less than $10^{-8} S.cm^{-1}$.

4. The counterelectrode as claimed in claim 1 wherein the fine particles exhibiting capacitance of not less than 10 farad/g are fine particles of porous carbon having a specific surface area of not less than 10 $m^2/g$.

5. The counterelectrode as claimed in claim 4 wherein the porous carbon is activated charcoal.

6. The counterelectrode as claimed in claim 2 wherein the fine particles capable of storing electrical charge of not less than 1 coulomb/g are fine particles of a material selected from the group consisting of an intercalation compound, an electrically conductive high molecular material and mixtures thereof.

7. The counterelectrode as claimed in claim 6 wherein said intercalation compound is selected from the group consisting of $TiS_2$, $MoS_2$, $CoO_2$, $NiO_2$, $W_{18}O_{49}$, $W_{20}O_{58}$, and mixtures thereof.

8. The counterelectrode as claimed in claim 6 wherein said electrically conductive high molecular material is selected from the group consisting of polyaniline, polythiophene, polypyrrole, polyphenylene vinylene, ployacene and mixtures thereof.

9. The counterelectrode as claimed in claim 1 or 2 wherein said electrically conductive dots contain 10 to 90 parts by weight of said fine particles and 90 to 10 parts by weight of a binder.

10. The counterelectrode as claimed in claim 9 wherein said binder is selected from the group consisting of a high molecular solid electrolyte, epoxy rein, acrylic resin, melamine resin, teflon, polystyrene, carboxymethyl cellulose and mixtures thereof.

11. The counterelectrode as claimed in claim 1 or 2 wherein said electrically conductive dots are arrayed in a uniform matrix.

12. The counterelectrode as claimed in claim 1 or 2 wherein said electrically conductive dots each have a shape selected from the group consisting of a cylinder, a cone, a square prism and a square pyramid.

13. The counterelectrode as claimed in claim 1 or 2 wherein said electrically conductive dots each have a size of 1 to 10000 μm and a height of 10 to 1000 μm.

14. The counterelectrode as claimed in claim 1 or 2 having a coverage ratio (sum of surface areas of the electrically conductive dots/surface area of the transparent electrically conductive substrate×100) of 3 to 70%.

15. The counterelectrode as claimed in claim 1 or 2 wherein said transparent electrically conductive substrate comprises a transparent substrate and a transparent electrically conductive film formed thereon and wherein a coating of a white-hued material is provided in registration with each of the electrically conductive dots between said transparent substrate and the transparent electrically conductive film.

16. The counterelectrode as claimed in claim 1 or 2 wherein said transparent electrically conductive substrate comprises a transparent substrate and a transparent electrically conductive film formed thereon, and wherein a coating of a white-hued material is provided on each of said electrically conductive dots.

17. A smart window comprising an electrochromic electrode having a transparent substrate, a transparent electrically conductive film formed on an inner surface of said transparent substrate and an electrochromic film formed on an inner surface of said transparent electrically conductive film, and the counterelectrode as defined in claim 1, said electrochromic electrode and the counterelectrode being arranged so that the electrically conductive dots and the electrochromic film face each other with an electrolyte interposed therebetween.

18. A smart window comprising an electrochromic electrode having a transparent substrate, a transparent electrically conductive film formed on an inner surface of said transparent substrate and an electrochromic film formed on an inner surface of said transparent electrically conductive film, and the counterelectrode as defined in claim 2, said electrochromic electrode and the counterelectrode being arranged so that the electrically conductive dots and the electrochromic film face each other with an electrolyte interposed therebetween.

19. The smart window as claimed in claim 17 or 18 wherein said electrochromic film is formed of a material selected from the group consisting of an electrochromic material colored by reduction, an electrochromic material colored by oxidation and an organic electrochromic material.

20. The smart window as claimed in claim 19 wherein said electrochromic material colored by reduction is selected from the group consisting of $WO_3$, $MoO_3$, $V_2O_5$ and $TiO_2$.

21. The smart window as claimed in claim 19 wherein said electrochromic material colored by oxidation is selected from the group consisting of NiO, $Cr_2O_3$, $MnO_2$, CoO, $IrO_2$ and Prussian blue.

22. The smart window as claimed in claim 19 wherein said organic electrochromic material is polyaniline.

23. A counterelectrode for a smart window comprising a transparent electrically conductive substrate and a plurality of electrically conductive dots arrayed on the transparent electrically conductive substrate, each of the electrically conductive dots containing fine particles capable of storing an electrical charge of not less than 1 coulomb/g wherein the fine particles are fine particles of a material selected from the group consisting of an intercalation compound, an electrically conductive high molecular material and mixtures thereof, wherein said intercalation compound is selected from the group consisting of $TiS_2$, $MoS_2$, $CoO_2$, $NiO_2$, $W_{18}O_{49}$, $W_{20}O_{58}$ and mixtures thereof.

24. The counterelectrode as claimed in claim 5 wherein the activated charcoal is carbonized and activated coconut husk, petroleum pitch, phenal resin, rayon, phenol fibers or polyacrylonitrile fibers.

* * * * *